United States Patent
Pere et al.

(10) Patent No.: US 11,608,443 B2
(45) Date of Patent: Mar. 21, 2023

(54) FIRE-RETARDANT COMPOSITION AND COATING

(71) Applicant: Teknologian tutkimuskeskus VTT Oy, Espoo (FI)

(72) Inventors: Jaakko Pere, Vantaa (FI); Vesa Kunnari, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 506 days.

(21) Appl. No.: 16/622,313

(22) PCT Filed: Jun. 26, 2018

(86) PCT No.: PCT/FI2018/050495
§ 371 (c)(1),
(2) Date: Dec. 13, 2019

(87) PCT Pub. No.: WO2019/002680
PCT Pub. Date: Jan. 3, 2019

(65) Prior Publication Data
US 2021/0147694 A1    May 20, 2021

(30) Foreign Application Priority Data
Jun. 26, 2017   (FI) .................................. 20175604

(51) Int. Cl.
| | |
|---|---|
| C09D 5/18 | (2006.01) |
| C09D 7/40 | (2018.01) |
| C09D 101/02 | (2006.01) |
| B82Y 30/00 | (2011.01) |
| B82Y 40/00 | (2011.01) |

(52) U.S. Cl.
CPC ............. *C09D 5/18* (2013.01); *C09D 7/67* (2018.01); *C09D 7/70* (2018.01); *C09D 101/02* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2012/0216718 A1* | 8/2012 | Berglund | C08K 5/0025 977/773 |
| 2014/0302336 A1* | 10/2014 | Heiskanen | C08K 3/34 106/204.3 |

FOREIGN PATENT DOCUMENTS

| | | |
|---|---|---|
| CN | 105754146 A | 7/2016 |
| CN | 106633195 A | 5/2017 |
| FI | 126698 B | 4/2017 |
| JP | 2013010891 A | 1/2013 |
| JP | 2016222877 A | 12/2016 |

(Continued)

OTHER PUBLICATIONS

Carosio et al: Oriented Clay Nanopaper from Biobased Components—Mechanism for Superior Fire Protection Properties. ACS Applied Materials & Interfaces, 2015, vol. 7, No. 10, pp. 5847-5856.

(Continued)

*Primary Examiner* — Joseph D Anthony
(74) *Attorney, Agent, or Firm* — Laine IP Oy

(57) ABSTRACT

According to an example aspect of the present invention, there is provided a non-toxic bio-based fire-retardant composition and fire-protective coating comprising high consistency nanofibrillated cellulose together with mineral component(s).

10 Claims, 3 Drawing Sheets

(56) References Cited

FOREIGN PATENT DOCUMENTS

| WO | WO2011059398 A1 | 5/2011 |
| WO | WO2013121083 A2 | 8/2013 |
| WO | WO2016001466 A1 | 1/2016 |

OTHER PUBLICATIONS

Kangas et al: High-consistency enzymatic fibrillation (HefCel)—a cost-efficient way to produce cellulose nanofibrils (CNF). Advanced Materials: TechConnect Briefs, 2016, pp. 181-183.

Liu et al: Clay nanopaper with tough cellulose nanofiber matrix for fire retardancy and gas barrier functions. Biomacromolecules, 2011, vol. 12, No. 3, pp. 633-641.

Liu et al: Fire-retardant and ductile clay nanopaper biocomposites based on montmorillonite in matrix of cellulose nanofibers and carboxymethyl cellulose. European Polymer Journal. Feb. 8, 2013. vol. 49, pp. 940-949.

* cited by examiner

FIRE-RETARDANT COMPOSITION AND COATING

FIELD

The present invention relates to fire protective compositions and structures comprising high consistency nanofibrillated cellulose together with mineral components, which provide easy direct applicability onto a target surface.

BACKGROUND

Flame retardants are a diverse group of chemicals, which are added to manufactured materials as finishes or coatings. Flame retardants inhibit spread of fire by suppressing the chemical reactions in the flame or by the formation of a protective layer on the surface of the material. Current opinion on environmental and health issues is a controversial point, but there are reports on unreliability, environmental harmfulness and health hazards of these compounds.

Fire protection of combustible structures is typically managed by fire retardant chemicals. Efficiency of these chemicals is sometimes questioned and they may also pose toxic hazards, for example halogenated compounds are recalcitrant in nature and can be enriched in food chains.

For these reasons nontoxic, bio-based fire retardants are of industrial interest. Novel bio-based fire retardants derived from natural resources would provide safer and sustainable chemical burden reducing solutions into ecosystems.

Carosio et al. (2015) and Liu et al. (2011) describe and characterize cellulose nanofiber (CNF)/clay nanocomposites, which are prepared by simple filtration. These nanocomposites are reported to have superior fire protection properties. The authors have identified the physical and chemical mechanisms behind the composites and concluded that the properties relate to the unique nanostructure and its low thermal conductivity, as well as high gas barrier properties and material interactions for char formation.

In these prior art methods the protective layers are obtained from very dilute suspensions (1-2%) by filtration. Thus, the methods are slow to carry out and require large amounts of water to be removed and/or evaporated.

FI 126698 B describes a method for producing fibrillated cellulose material in an improved and energy efficient way. The method combines fibrillation of high consistency cellulose-based starting material by a specific enzyme mix and non-grinding mechanical mixing. The method provides a fibrillated cellulose material for various uses, and a suitable starting point for the present invention.

SUMMARY OF THE INVENTION

The invention is defined by the features of the independent claims. Some specific embodiments are defined in the dependent claims.

According to a first aspect of the present invention, there is provided a bio-based fire-retardant composition in which high consistency nanofibrillated cellulose preferably together with a mineral component(s) self-assembly as a fire protective layer, which is easily applicable target surfaces.

According to a second aspect of the present invention, there is provided a fire-protective coating having a layered structure and comprising the fire-retardant composition.

According to a third aspect of the present invention, there is provided a use of the fire-retardant composition on various natural surfaces.

These and other aspects, together with the advantages thereof over known solutions are achieved by the present invention, as hereinafter described and claimed.

The fire-retardant composition of the present invention is mainly characterized by what is stated in the characterizing part of claim 1.

The fire-protective coating of the present invention is mainly characterized by what is stated in the characterizing part of claim 5.

The use of the fire-retardant composition of the present invention is mainly characterized by what is stated in claim 12.

Considerable advantages are obtained by means of the invention. For example, totally bio-based and chemical composition of this invention is sustainable, environmentally safe and does not induce health hazards. The fire-protective layer can be applied directly on to surface on-site. In addition to direct application, fast drying on to the surfaces provides advantage over low consistency nanocellulose related solutions.

Next, the present technology will be described more closely with reference to certain embodiments.

EMBODIMENTS

The present technology provides bio-based fire-retardant compositions in which high consistency nanofibrillated cellulose preferably together with a mineral component(s) self-assembly as a fire protective layer, which are easily applicable to target surfaces.

Figure 1:
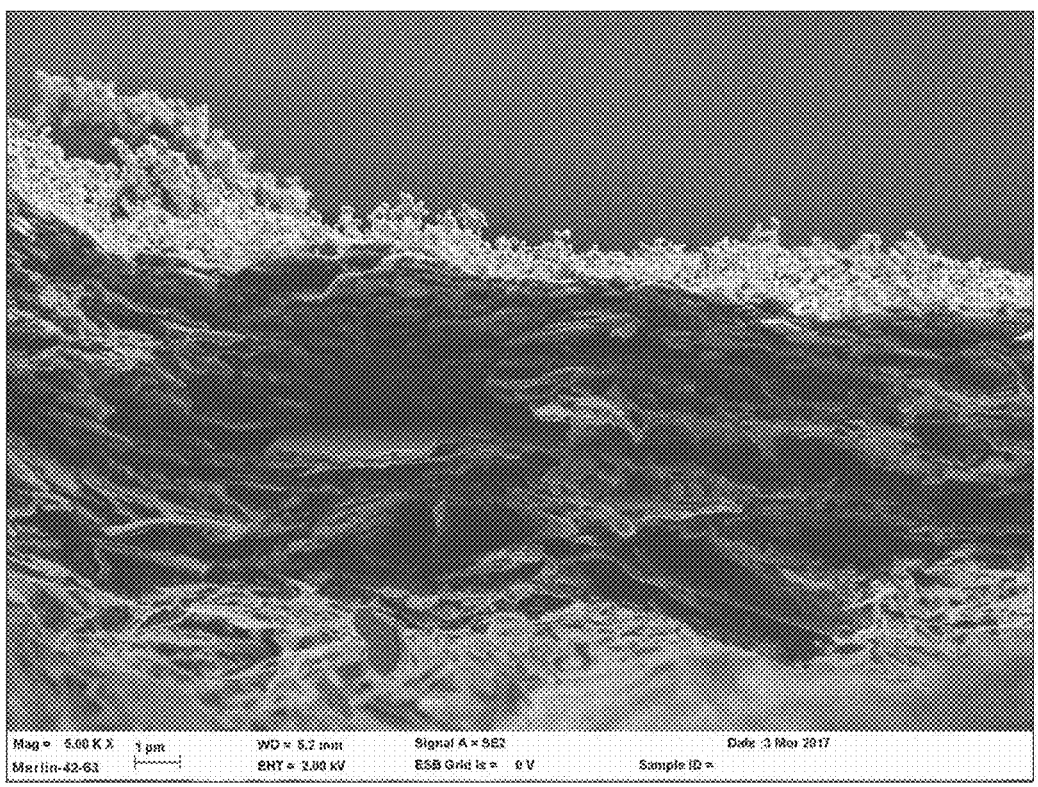
FIG. 1 is a SEM image showing high consistency CMF/Kaolin mixture in 50/50 weight ratio. Hexagon-shaped kaolin pigment can be identified within the cross-section image.
Figure 2:
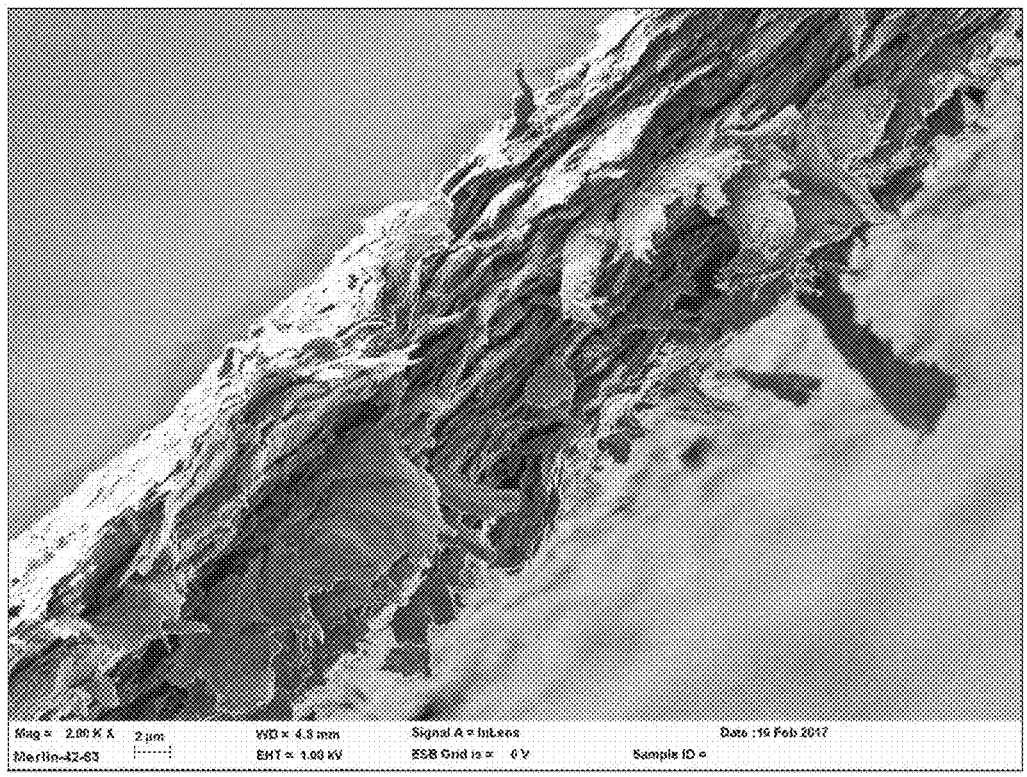
FIG. 2 is a SEM image showing layered protective structure adhered on wood surface.
Figure 3:
FIG. 3 is a photo describing the outlook of washed and dewatered high consistency CNF showing a paste-like, non-gel nature, which is further easily dispersed for the desired solids content by high shear mixer.
Figure 4:
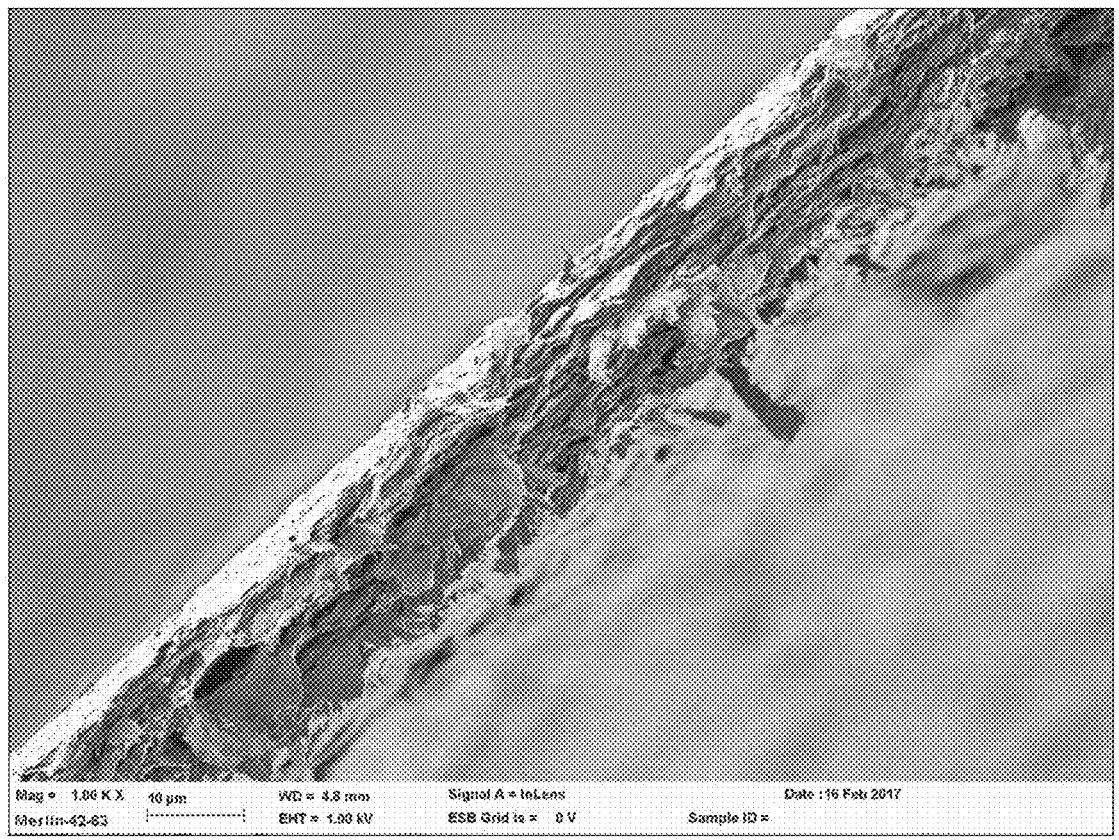
FIGS. 4 and 5 are SEM images showing high consistency CNF/Sumecton mixture (8%) added on surface using brush (FIG. 4) and spray (FIG. 5) showing the layered structure of the protective coating.
Figure 5:
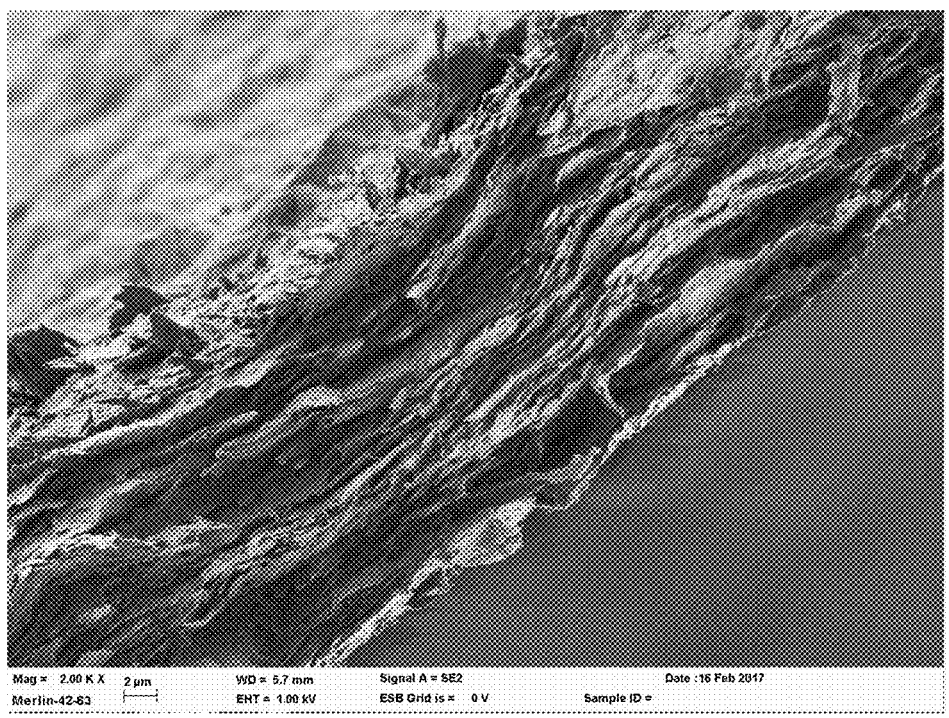

One aspect of the present invention is a bio-based non-toxic fire-retardant composition, which comprises a mixture of fibrillated cellulose nanofibers (CNF) at consistency of 8 to 60%, and at least one type of mineral component in a form of wet slurry or paste at weight ratio between 10 to 90% (CNF/mineral component).

In one embodiment of the present invention the weight ratio of the fibers and the mineral component is between 25 to 75% (CNF/mineral component).

According to one embodiment of the present invention, the viscosity of the fire-retardant composition is between 25000 and 35000 mPas, such as for example around 29000 mPas for 50% CNF/mineral component mixture at 8% consistency.

The present invention is based on self-organizing property of cellulose nanofibrils (CNF) and a mineral component in a form of wet slurry or paste. Nanofibrillated cellulose has a natural film forming property in which mineral particles are assembled like brick and mortar structure. During formation of the organized, layered structure nanocellulose forms a network, which serves as a continuous matrix around oriented pigment platelets and imparts toughness and rigidity. The layered, organized structures promote to thermal insulation/low thermal conductivity and high gas barrier properties which contribute to flame retardant properties.

One embodiment of the present invention is a fire-protective coating having a layered structure, which comprises the fire-retardant composition as a protective layer on a target surface, in which fibrillated CNF forms a continuous matrix around oriented plate-like mineral components.

According to one embodiment of the present invention, the layered structure of the fire-protective coating has 2 to 20 layers, more preferably 2 to 5 layers, and a total thickness of 100 to 300 μm.

According to one embodiment of the present invention the dry weight per square meter of the protective layer is between 40 and 85 g/m².

Thus, according to one preferred embodiment of the present invention high consistency nanofibrillated cellulose is used due to its high solids content (such as for example 20-25%) when compared to traditional nanofibrillated cellulose of low solids content (2-4%). High solids content (at least 10 times higher than in the traditional nanofibrillated cellulose) associated with low viscosity provide direct application and fast drying of the fire-retardant composition on surfaces to be protected.

According to one embodiment of the present invention, montmorillonite clay or smectite platelets are used as the mineral component.

According to one embodiment of the present invention, the mineral component is a plate-like or a sheet-like structure, such as mica, montmorillonite, smectite, kaolin or silicate.

According to one embodiment of the present invention, the fire-retardant composition comprises 25 to 75% of a montmorillonite or a smectite component of the weight of the CNF.

In one embodiment of the present invention, CNF and the mineral component are mixed in a high shear mixer to obtain uniform slurry. The pigment content weight ratio can vary between 20 and 80% (CNF/pigment). The use of high solids CNF as the cellulose matrix component gives the opportunity to operate during application at solids content between 10 to 20%, which is not possible with traditional CNF. Due to high solids content direct application on surfaces to be protected is possible. Drying of the sprayed CNF-pigment layer is fast and a protective coating consisting of several consecutive layers. This enables for example application on constructions sites using traditional painting methods.

One embodiment of the present invention is a method for producing the fire-retardant composition by mixing fibrillated cellulose nanofibers (CNF) at consistency of 8 to 60% together with a mineral component at weight ratio between 25 to 75% (CNF/mineral component) in a high shear mixer to obtain a uniform slurry.

In one embodiment of the present invention, prior to mixing the CNF and mineral component are separately disintegrated to form a homogenous slurry of CNF and a uniform mineral component solution, after which the mineral component solution is added to the CNF slurry under high shear mixing for at least 30 minutes.

CNF have a natural adhesion on cellulose and lignocellulosic materials giving rise to a firm and smooth coating on many natural materials. Thus, one embodiment of the present invention is a use of the material of the present invention on natural surfaces, such as on surfaces comprising cellulose or other natural fibrous material capable of forming chemical bonds together with the fire-retardant composition of the invention.

According to one embodiment of the present invention, the CNF is produced from unbleached cellulose pulp or can be chemically post-modified thus improving adhesion of the fire-retardant composition on non-cellulose surfaces.

The fire-retardant composition and/or fire-protective coating according to the present invention is certified by EN ISO 11925-2:2010 standard.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in protecting cellulose and wooden structures within constructions, furniture and interior products from fire. Another embodiment is to fire protect cellulose materials in garments and textiles. In addition, the present invention can be applied to paints and coating materials. In general, the embodiments of the present invention can be used on plastic, paper, carton, cellulose, wood and metal surfaces for fire protection.

Example 1. Preparation of High Consistency CNF

Bleached softwood pulp from a Finnish pulp mill (Metsä-Fibre, Äänekoski, Finland) was used as the raw material for producing CNF at high consistency. The enzymatic treatment was carried out at a consistency of 25 w-% for 6 h at 70° C. using a two shaft sigma mixer (Jaygo Incorporated, NJ, USA) running at 25 rpm. In the treatment a commercial enzyme preparation rich in cellobiohydrolase activity was used at a dosage of 0.6%. The pulp batch size was 300 g on dry basis. After the treatment enzyme activity was stopped by increasing temperature of the mixer to 90° C. for 30 min. The fibrillated material was diluted with deionised water, filtered and washed thoroughly with deionised water. Finally, the fibrillated material was dewatered to a consistency of ~20% by filtration. Yield of the fibrillated material was ~90%. The material was stored at +4° C. until used.

Example 2. Mixing of Pigment and High Consistency CNF

Different pigments and compounds were used in this work (Table 1).

TABLE 1

List of pigments used.

| Trade name | Component | Producer |
| --- | --- | --- |
| Sumecton SA | Modified smectite | Kunimine Industries Co., Ltd |
| Kunipia | Montmorillonite | Kunimine Industries Co., Ltd |
| Capim SP-50 | Kaolin | Imerys |
| Exolit AP-420 | Ammonium polyphosphate | Clariant |
| Bindzil 50 | Silicium dioxide | AkzoNobel |

Inorganic pigment and high consistency CNF were disintegrated separately prior to mixing. Disintegration of Sumecton and Kunipia pigments was carried out as follows: 7% pigment slurry was prepared in deionized water (20° C.) and the slurry was mixed for 30 minutes at room temperature with Diaf mixer (Pilvad A/S) running at 3000 rpm. The dry pigments were added slowly into water under agitation during 60 seconds. Goal of the disintegration was to have a uniform pigment solution and water where individual pigment layers are separated. In case of nano clays such as montmorillonite the exfoliation of pigments should be as complete as possible. Exfoliation of pigments can be detected as thickening of the slurry and increase of viscosity. The disintegration can be performed under high shear mixing or homogenization and mixing can be assisted by using proper additives. Kaolin (Capim SP) was mixed into water (20° C.) solution to reach 50% dry solids content using Diaf mixer and disintegration was continued for 20 minutes to disperse all kaolin particles.

Exolit and Bindzil were used as commercial references and delivered as solutions and these were mixed directly with high consistency CNF in similar way as pigments described below. No dilution of Exolit or Bindzil was done prior to mixing with high consistency CNF.

High consistency CNF was disintegrated by adding tap to water to reach solids content of 8% and mixed with Diaf for 60 minutes to obtain homogenous slurry. Then exfoliated pigments were added slowly to 8% high consistency CNF fibril slurry under high shear mixing using Diaf mixer. Mixing was continued for at least 30 minutes. High consistency CNF and pigments were mixed in different weight ratios (fibre/clay) between 25, 50 and 75%.

The performance of pigment or filler in terms of fire retardancy is dependent on for example the size distribution and aspect ratio.

Example 3. Coating of Test Samples

The high consistency CNF/clay mixture has natural affinity to cellulose and wood surface. In practice this means that a single following layer may be added on top of under laying layer. Multiple layers were added on previous dry layer after short drying period with warm air (approximately 60° C.) created by a blower. From 2 up to 20 layers can be added on top of each other depending on the wet film thickness and desired amount of protection, but from 2 to 5 layers has been seen to give adequate performance.

High consistency CNF/clay mixture has a considerable affinity to various types of surfaces. High consistency CNF/mixture has successfully been applied on different grades of plastic (PP, PE, PVC etc.), on different paper grades and carton boards and on various types of wooden materials (logs, veneers, sawn timber, plain timber etc.) and even on metallic surfaces. The surface energy, chemical composition and surface topography play key role in affinity and need to be taken into account and controlled in each case.

Several alternative methods exist when applying of high consistency CNF/clay mixture onto a surface to be protected. Key role in addition is that it is done directly onto surface. The application is at least possible to implement using spraying, paint brush or roller. Commercially available equipment from regular hardware stores can be used without any issues when operating with high consistency CNF/clay mixture. All application methods may be used to add multiple layers described previously.

Example 4. Trials for Fire-Retardancy

Trials were done using sawn timber planks (22×100 mm) from softwood spruce as test material. The high consistency CNF/clay mixture prepared as described in Example 2 was used. The planks were conditioned standard moisture/temperature room for one week prior to experiments and weighted. Four layers were added on top of previous layer with intermittent drying of previous layer by warm air (approximately 60° C.). The high consistency CNF/clay mixture was added using a 50 mm wide brush. The grammages of protective layers are shown in Table 2.

TABLE 2

Grammage (g/m²) of the protective layer (presented as dry weight of high consistency CNF/pigment per square meter).

| Sample | Grammage of protective layer, g/m² |
| --- | --- |
| High consistency CNF | 16.7 ± 5.4 |
| Sumecton 75% | 46.1 ± 2.1 |
| Sumecton 50% | 47.9 ± 5.9 |
| Sumecton 25% | 47.7 ± 5.3 |
| Kunipia 50% | 53.8 ± 6.1 |
| Capim SP 50 | 80.5 ± 0.5 |
| Exolit AP 420 50% | 50.3 ± 3.3 |
| Bindzil 50% | 63.8 ± 1.7 |

Figure 6:
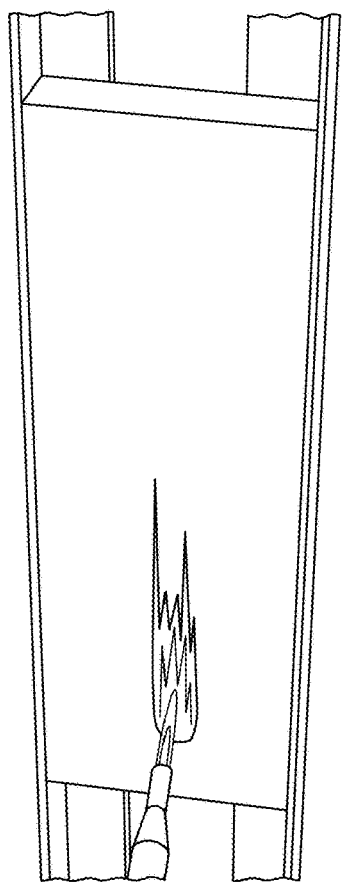
FIG. 6 is a photo showing the experimental set-up for fire retardant trials.

The trials for fire retardant effects were implemented by following standard "EN ISO 11925-2:2010 Reaction to fire tests—Ignitability of products subjected to direct impingement of flame—Part 2: Single-flame source test (ISO 11925-2:2010)". The experimental set up was identical apart from excluding the controlled air flow in the fume hood surround the experiment set up (FIG. 6).

Test pieces were placed in aluminium rig and procedures and distances set according to standard ISO 11925-2:2010. The trials were carried out in triplicates. The result of each trial was evaluated 1) by visual observation of ignition and by measuring 2) the weight difference of timber planks before and after the trial, 3) the height of burned area and 4) burn time after 30s flame exposure. Untreated intact timber planks served as reference.

The results are summarized in Table 3. Sumecton and Kunipia as the pigment components together with the high consistency CNF gave the best fire retardant effect. The high consistency CNF/Sumecton (or Kunipia) mixture ratio of 50%/50% showed a very good performance. Also a higher ratio of nanoclay (75%) with high consistency CNF gave a good protection, but this ratio effects on the adhesion properties on wood plank surface and attachment of the protective layer becomes weaker. Also the high consistency CNF 75%/Sumecton 25% combination showed good performance. Kaolin pigments show weaker performance perhaps due to larger pigment size. The reference compounds Exolit and Bindzil did not show as good fire retardant performance as high consistency CNF/Sumecton or high consistency CNF/Kunipia combinations.

TABLE 3

Summary of the results of the fire retardant trials.

| Sample | Weight difference after burn test, g | Height of the burned area, mm | Burn time after flame exposure, s |
| --- | --- | --- | --- |
| Ref, no coating | 0.64 ± 0.01 | 150 ± 28 | 60 |
| High concistency CNF | 0.41 ± 0.1 | 82 ± 7.6 | 52 ± 8.7 |
| Sumecton 75% | 0.29 ± 0.04 | 53 ± 14 | 37 ± 6.8 |
| Sumecton 50% | 0.30 ± 0.03 | 60 ± 8.7 | 45 ± 13 |
| Sumecton 25% | 0.32 ± 0.03 | 77 ± 7.6 | 41 ± 6.7 |
| Kunipia 50% | 0.24 ± 0.03 | 41 ± 8.7 | 32 ± 2.5 |
| Capim SP 50 | 0.45 ± 0.2 | 85 ± 26 | 45 ± 15 |
| Exolit AP 420 50% | 0.39 ± 0.08 | 73 ± 5.7 | 30 |
| Bindzil 50% | 0.35 ± 0.05 | 75 ± 0 | 38 ± 2.5 |

CITATION LIST

Patent Literature

1. FI 126698 B1

Non-Patent Literature

1. Carosio F., Kochumalayil J., Cuttica F., Camino G., Berglung L., *Oriented Clay Nanopaper from Biobased Components—Mechanism for Superior Fire Protection Properties*, ACS Applied Materials & Interfaces (2015), 7(10), 5847-5856.
2. Liu A., Walther A., Ikkala O., Belova L., Berglund A., Lars A., *Clay nanopaper with tough cellulose nanofiber matrix for fire retardancy and gas barrier functions*, Biomacromolecules (2011), 12(3), 633-641.

The invention claimed is:

1. An article comprising:
    a body having a surface: and
    a fire-protective coating on the surface, the fire-protective coating comprising a mixture of:
        fibrillated cellulose nanofibers (CNF) having a consistency of 8 to 60%, and
        at least one mineral component in a form of wet slurry or paste at a weight ratio of the fibrillated cellulose nanofibers to the at least one mineral component of between 10 to 90%,
    wherein the least one mineral component comprises oriented plate-like mineral components,
    wherein the fibrillated cellulose nanofibers form a continuous matrix around the oriented plate-like mineral components, and
    wherein the fire-protective coating has a layered structure comprising 2 to 20 layers of the fire-protective coating and has a total thickness is 100 to 300 μm.

2. The article according to claim 1, wherein a dry weight per square meter of the fire-protective coating is between 40 and 85 g/m².

3. The article according to claim 1, wherein the coating is certified by EN ISO 11925-2:2010 standard.

4. The article according to claim 1, wherein the at least one mineral component comprises a member selected from the group consisting of mica, montmorillonite, smectite, kaolin, and silicate.

5. The article according to claim 1, wherein a weight ratio of the fibrillated cellulose nanofibers to the at least one mineral component is between 25 to 75%.

6. The article according to claim 1, wherein the at least one mineral component comprises a plate-like or a sheet-like structure.

7. The article according to claim 1, wherein the fibrillated cellulose nanofibers comprise a solids content of from 20-25 wt %.

8. The article according to claim 1, wherein the surface comprises a member selected from the group consisting of a plastic, paper, cellulose, wood, and metal surface.

9. The article according to claim 1, wherein the surface comprises a cellulose or other natural fibrous material capable of forming chemical bonds together with the fire-protective coating.

10. An article comprising:
    a body having a surface: and
    a fire-protective coating on the surface, the fire-protective coating comprising a mixture of:
        fibrillated cellulose nanofibers (CNF) having a consistency of 8 to 60%, and at least one mineral component in a form of wet slurry or paste at a weight ratio of the fibrillated cellulose nanofibers to the at least one mineral component of between 10 to 90%, wherein the least one mineral component comprises oriented plate-like mineral components, wherein the fibrillated cellulose nanofibers form a continuous matrix around the oriented plate-like mineral components, and wherein a dry weight per square meter of the fire-protective coating is between 40 and 85 $g/m^2$.

* * * * *